United States Patent
Yanof (10) Patent No.: US 7,538,799 B2
(45) Date of Patent: May 26, 2009

(54) SYSTEM AND METHOD FOR FLICKER DETECTION IN DIGITAL IMAGING

(75) Inventor: Arnold W. Yanof, Gilbert, AZ (US)

(73) Assignee: Freescale Semiconductor, Inc., Austin, TX (US)

(*) Notice: Subject to any disclaimer, the term of this patent is extended or adjusted under 35 U.S.C. 154(b) by 685 days.

(21) Appl. No.: 11/036,818

(22) Filed: Jan. 14, 2005

(65) Prior Publication Data

US 2006/0158531 A1 Jul. 20, 2006

(51) Int. Cl.
H04N 9/73 (2006.01)
(52) U.S. Cl. .................................. 348/226.1
(58) Field of Classification Search ............. 348/226.1, 348/447, 227.1, 228.1; 359/229
See application file for complete search history.

(56) References Cited

U.S. PATENT DOCUMENTS

| | | | | |
|---|---|---|---|---|
| 5,929,935 | A * | 7/1999 | Young et al. | 348/607 |
| 6,154,258 | A * | 11/2000 | Ohtsuka | 348/578 |
| 6,271,884 | B1 | 8/2001 | Chung et al. | |
| 6,295,085 | B1 | 9/2001 | Munson et al. | |
| 6,491,223 | B1 | 12/2002 | Longacre, Jr. et al. | |
| 6,519,002 | B1 | 2/2003 | Tomaszewski | |
| 7,106,368 | B2 * | 9/2006 | Daiku et al. | 348/226.1 |
| 2002/0131491 | A1 | 9/2002 | Smith et al. | |
| 2002/0154225 | A1 | 10/2002 | Matsumoto et al. | |
| 2002/0158988 | A1 * | 10/2002 | Wischermann | 348/571 |
| 2003/0090566 | A1 | 5/2003 | Smith et al. | |
| 2003/0112343 | A1 | 6/2003 | Katoh et al. | |
| 2003/0142239 | A1 | 7/2003 | Yoshida et al. | |
| 2004/0012692 | A1 | 1/2004 | Arazaki | |
| 2004/0080630 | A1 | 4/2004 | Kim | |
| 2005/0046704 | A1 * | 3/2005 | Kinoshita | 348/226.1 |

FOREIGN PATENT DOCUMENTS

| | | |
|---|---|---|
| WO | WO 02/13510 A2 | 2/2002 |
| WO | WO 02/13510 A3 | 2/2002 |
| WO | WO 02/098112 A2 | 12/2002 |
| WO | WO 02/098112 A3 | 12/2002 |
| WO | WO 2004/047427 A1 | 6/2004 |

* cited by examiner

*Primary Examiner*—Sinh N Tran
*Assistant Examiner*—Paul Berardesca
(74) *Attorney, Agent, or Firm*—Ingrassia, Fisher & Lorenz, P.C.

(57) ABSTRACT

A system and method for detecting flicker in a digital image. The system and method detects flicker by performing a frame-to-frame comparison of image data. The frame-to-frame comparison of image data is based on dividing each image into multiple columns, and performing a weighted sum of the pixel luminance in each column using a pattern of alternating sign weights. The weighted sum of luminance for each column in a first frame is compared to the weighted sum of luminance for that column in a second frame to determine if there is a simultaneous luminance variation in those columns. For example, if the difference between weighted sums of luminance between frames exceeds a threshold value in a predetermined number of columns then there is a simultaneous luminance variation in those columns, and a horizontal pattern of flicker has been detected in the image data.

33 Claims, 3 Drawing Sheets

SYSTEM AND METHOD FOR FLICKER DETECTION IN DIGITAL IMAGING

FIELD OF THE INVENTION

This invention generally relates to imaging systems, and more specifically relates to digital imaging.

BACKGROUND OF THE INVENTION

Digital imaging systems have created a revolution in photography and cameras. A digital camera is similar to a film camera except that the film is replaced with an electronic sensor. The sensor is comprised of an array of photo detectors that change the photons that strike them into electrons providing a signal at each pixel proportional to the number of photons, or the amount of light at each pixel. Presently, most consumer digital cameras employ Charge Coupled Device (CCD) or Complementary Metal Oxide Semiconductor (CMOS) sensors. To facilitate the collection of light, many of the sensors employ a small lens-like structure covering each pixel, which is called a microlens. These microlenses are typically made by forming a layer of photoresist that is placed upon the pixel frame.

When subjected to light, the image sensor converts incident photons to electrons. The conversion enables analog electronic circuitry to process the image "seen" by the sensor array. The electrons gathered by these sensors are stored in small capacitors that are read out as a series of varying voltages, which are proportional to the image brightness. An Analog to Digital Converter (ADC) conditions these voltages for processing by a computer within the camera. The data is then processed to form a picture of the image "seen" by the sensor array.

CMOS sensors typically use a 'rolling' shutter which causes the sensitive pixel elements to acquire the image information in a sequential fashion, moving from top to bottom in the image. Because there is a time delay in the image acquisition between one row of the image pixels and a subsequent row, there may have been a change in the actual light level, causing unwanted variability in the image.

One type of unwanted variability that can be present in a digital image quality is flicker. In general, flicker is a perceivable repeating fluctuation in the brightness level between rows of pixels in the image. In a digital camera, flicker can be caused by the fluctuation in light provided by common light sources. Specifically, almost all artificial light sources are modulated by the alternating current which powers them. This modulation in alternating current can cause repeating fluctuations in light intensity, from bright to dark and dark to bright. For example, some light sources, such as inexpensive fluorescent light and low temperature tungsten lighting are particularly likely to create light intensity fluctuations that vary at power line frequencies. These intensity fluctuations in light output occur at a relatively high rate (e.g., 120 Hz) and are not generally noticeable to the naked human eye. However, these fluctuations can interact with the digital camera timing due to the rolling shutter in the CMOS sensor, resulting in noticeable variability in the digital image. For example, the fluctuations can result in horizontal bars of light and dark appearing in the images. Even if these bars are not as strong in contrast as the objects in the image, the bars can be noticeably regular and apparent across the bright parts of the image. One effect is the appearance of regularly-spaced, horizontal bars in a still image. Furthermore, in a live-view image, the rolling of these bars causes apparent flicker of the entire image.

One way to address flicker in a digital camera is to change the operational parameters of the camera when flicker occurs. In these methods, when flicker is detected the operational parameter of the camera is adjusted to reduce and/or eliminate the flicker. For example, the electronic shutter speed of the camera can be adjusted to operate at a frequency that is less likely to interact with the light intensity fluctuations. Other techniques can also be used to compensate and reduce the flicker in the resulting digital images.

For these methods to work, a reliable and efficient method for detecting flicker is needed. These methods should be able to reliably detect flicker even where background features include shapes with similar variations. Unfortunately, previous methods of flicker detection have had limited reliability and/or have required large amounts of computing resources. Thus, what is needed is a system and method for flicker detection that improves the reliability and efficiency of flicker detection in a digital camera.

BRIEF SUMMARY OF THE INVENTION

The present invention provides a system and method for detecting flicker in a digital image. The system and method detects flicker by performing a comparison of image data. This comparison of image data is based on dividing each image into multiple columns, and performing a weighted sum of the pixel luminance in each column using a pattern of alternating sign weights. Specifically, the pattern of alternating sign weights is used to sum the pixel luminance for each column in the image, with the sign applied to each pixel determined by the position of its row in the pattern of alternating sign weights. The pattern of alternating sign weights is selected to potentially correspond to potential luminance variation in the rows, and thus when used to sum the pixel luminance the pattern can potentially magnify the effect of flicker in the image data. The weighted sum of luminance for each column in a first frame is compared to the weighted sum of luminance for that column in a second frame to determine if there is a simultaneous luminance variation in those columns. For example, if the difference between weighted sums of luminance between frames exceeds a threshold value in a predetermined number of columns then there is a simultaneous luminance variation in those columns, and a horizontal pattern of flicker has been detected in the image data. The operational parameters of the digital camera can then be adjusted to reduce or compensate for the flicker detected in the image data.

In one embodiment, the frame-to-frame comparison is performed using multiple patterns of alternating sign weights signs having different relative phases. For example, the comparison uses two patterns of alternating sign weights 90 degrees out of phase with each other. This improves the ability to detect flicker by increasing the probability that flicker in the image will occur in phase with at least one of the patterns of alternating sign weights.

In one embodiment, flicker is detected when the difference between weighted sums in the luminance between frames exceeds a threshold value for all columns in the image. In an alternative embodiment, flicker is detected when the difference exceeds the threshold value in a predetermined percentage of columns, such as 3 out of 4 columns in the image.

In one embodiment, the difference between weighted sums in the luminance between frames is compared to a threshold value determined at least in part by the overall luminance in that column. In another embodiment, the difference between weighted sums in the luminance is compared to a constant threshold value.

The present invention thus provides a system and method for detecting flicker in a digital image by performing a frame-to-frame comparison of image data based on dividing each image into multiple columns, and performing a weighted sum of the pixel luminance in each column using a pattern of alternating sign weights.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a system and method for detecting flicker in a digital image. The system and method detects flicker by performing a frame-to-frame, column-to-column, and row-to-row comparison of image data. The frame-to-frame comparison of image data is based on dividing each image into multiple columns, and performing a weighted sum of the pixel luminance in each column using a pattern of alternating sign weights for different rows.

Figure 1:
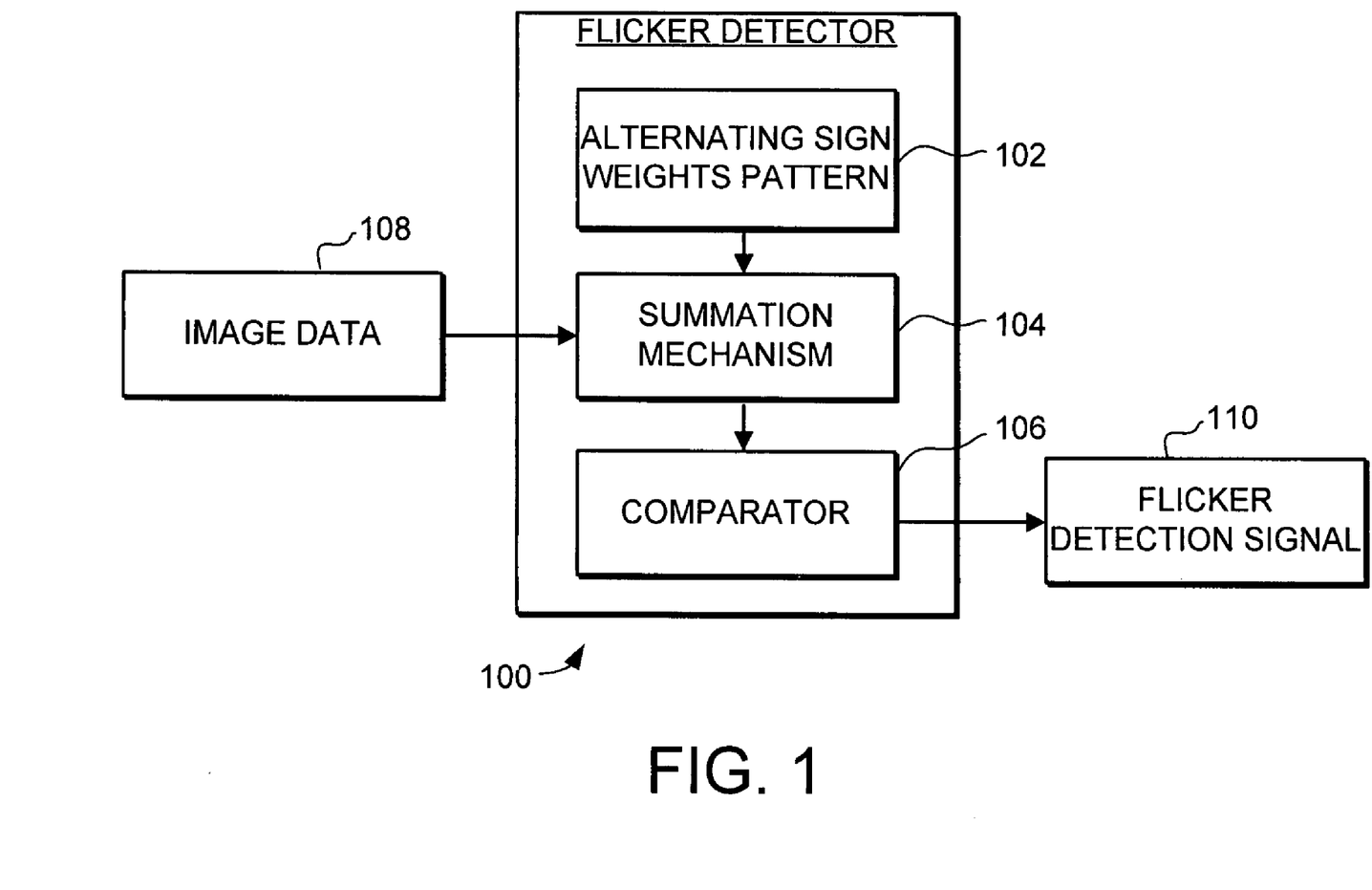
FIG. 1 is a schematic view of an flicker detector in accordance with an embodiment of the invention.

Turning now to FIG. 1, a flicker detector 100 in accordance with an embodiment of the invention is illustrated schematically. The flicker detector 100 includes an alternating sign weights pattern 102, a summation mechanism 104, and a comparator 106. The flicker detector 100 receives image data from the camera, with that image data including rows of pixel luminance data. The summation mechanism 104 and the alternating sign weights pattern 102 are used to sum the pixel luminance for each column in the image, with the sign applied to each pixel determined by the position of its row in the pattern of alternating sign weights 102. The pattern of alternating sign weights 102 is selected to potentially correspond to potential luminance variation in the rows, and thus when used to sum the pixel luminance the pattern can potentially magnify the effect of flicker in the image data. The weighted sum of luminance for each column in a first frame and a second frame is passed to comparator 106. The comparator 106 compares the weighted sum of luminance for the columns in the first frame with the corresponding columns in the second frame to determine if there is a simultaneous luminance variation in those columns. For example, if the difference between weighted sums of luminance between frames exceeds a threshold value in a predetermined number of columns then there is a simultaneous luminance variation in those columns, and a horizontal pattern of flicker has been detected in the image data. When flicker is detected, the flicker detection signal 110 is asserted and the operational parameters of the digital camera can then be adjusted to reduce or compensate for the flicker detected in the image data 108.

In one embodiment of flicker detector 100, the frame-to-frame comparison is performed using multiple patterns of alternating sign weights having different relative phases. For example, the comparison uses two patterns of alternating sign weights 90 degrees out of phase with each other. This improves the ability to detect flicker by increasing the probability that flicker in the image will occur in phase with at least one of the patterns of alternating sign weights.

In another embodiment of flicker detector 100, the flicker is detected when the difference between weighted sums in the luminance between frames exceeds a threshold value for all columns in the image. In an alternative embodiment, flicker is detected when the difference exceeds the threshold value in a predetermined percentage of columns, such as 3 out of 4 columns in the image.

In another embodiment of flicker detector 100, the difference between weighted sums in the luminance between frames is compared to a threshold value determined at least in part by the overall luminance in that column. In another embodiment, the difference between weighted sums in the luminance is compared to a constant threshold value.

In one embodiment, the flicker detector 100 detects flicker by performing several analyses of image data, including (1) a determination whether the image brightness varies from row to row at the unique frequency(ies) associated with artificial light sources, (2) a determination whether these variations are strictly in the horizontal (row) direction across the image, and (3) a determination whether these variations are changing in a frame-to-frame comparison of image data. Flicker situations result in all three of the above conditions, and if all three of the above conditions occur simultaneously, then there is a high probability that flicker is present. The above three analyses of image data are based on dividing each image into multiple columns, and performing a weighted sum of the pixel luminance in each column using a pattern of alternating sign weights.

The flicker detector 100 would typically be implemented as part of a digital camera, such as a still or video camera. For example, the flicker detector 100 can be implemented as a hardware block, which can operate at high speed on each frame of data to acquire the needed sums in each of the columns of image data, together with a software block which analyzes the completed sums, once per frame, to determine whether the non-uniformity is present, whether it is horizontal, and whether it changes from frame to frame. When implemented as part of a digital camera, the flicker detector 100 detects flicker and provides notification to the camera that flicker has been detected. The camera can then adjust the operational parameters of the camera to reduce the flicker. For example, the camera can adjust the electronic shutter rate to reduce flicker. That is, if flicker at 60 Hz is detected, the shutter rate can be made changed to a nearby value that is long enough to contain an equal number of maxima and minima in the light intensity at 60 Hz, causing each pixel in the image to experience the exact same total amount of reflected illumination intensity, and eliminating the flicker completely.

Figure 2:
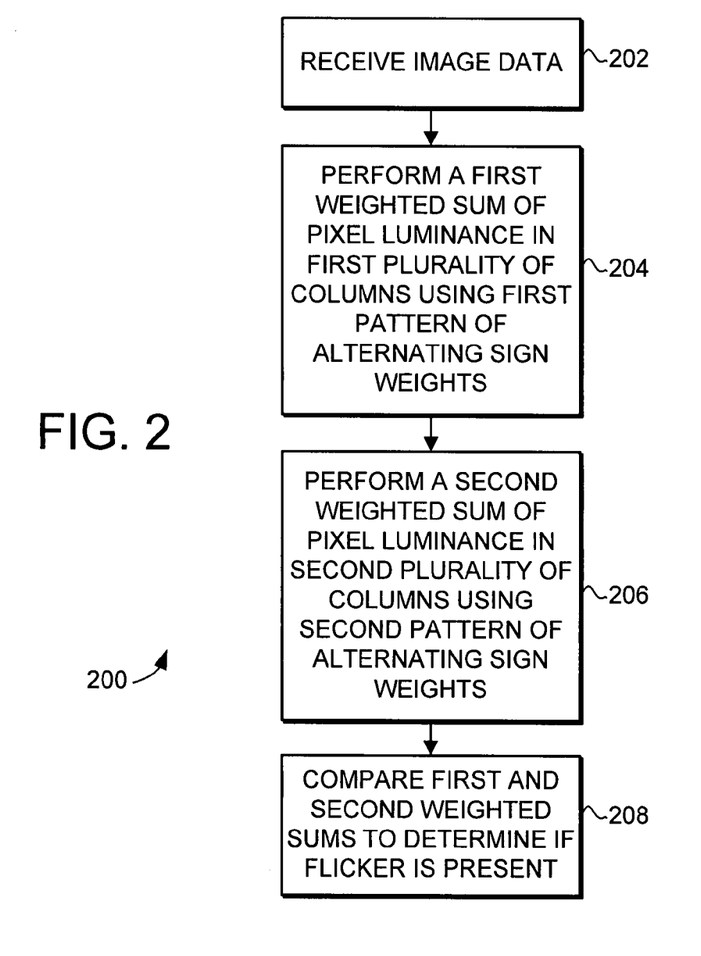
FIG. 2 is a flow diagram of a flicker detection method in accordance with an embodiment of the invention.

Turning now to FIG. 2, a method 200 for detecting flicker in accordance with an embodiment of the invention is illustrated. The first step 202 is to receive image data from the digital camera sensor. The image data will typically comprise pixel information arranged in rows and columns. For example, in a digital camera that uses a Bayer color pattern, the pixel information will comprise rows of red and green pixels alternating with rows of blue and green pixels.

In some cases it will only be necessary to use a portion of the image data to detect flicker. For example, in some cases it will be desirable to use only green pixel information, as most detail is found in the green pixels. In other cases with other data formats flicker can be detected by analyzing the luminance information. For example, for data in YCC format (where data is formatted into a luminance channel Y and two color channels Cb and Cr) flicker can be detected by analyzing the luminance channel Y.

To detect flicker it is desirable to use image data from multiple frames. Preferably, from multiple consecutive frames of image data. This allows for changes in luminance that occur as a result of rolling flicker to be accurately detected, while reducing the probability that other shapes in the image will be misinterpreted as flicker. Thus, the image data would include image data from at least a first frame and a second frame, and the image data from the first and second frame would be analyzed to determine if flicker exists in the image data.

With the image data received, the next step 204 is to perform a first weighted sum of pixel luminance in a first plurality of columns defined in the image data using a first pattern of alternating sign weights. The first weighted sum determines the luminance in the plurality of columns for a first frame of image data. The pattern of alternating sign weights is selected to potentially correspond to potential luminance variation in the rows, and thus when used to sum the pixel luminance the pattern can potentially magnify the effect of flicker in the image data and effectuate detection of flicker.

The next step 206 is to perform a second weighted sum of pixel luminance in a second plurality of columns defined in the image data using a second pattern of alternating sign weights. The second weighted sum determines the luminance in the plurality of columns for a second frame of image data. Again, the second pattern of alternating sign weights is selected to potentially correspond to potential luminance variation in the rows, and thus when used to sum the pixel luminance the pattern can potentially magnify the effect of flicker in the image data. In some embodiments, the first and second pattern of alternating sign weights are identical patterns, but in other cases different patterns could be used.

The next step 208 is to compare the weighted sum of luminance for each column in a first frame to the weighted sum of luminance for that column in a second frame to determine if there is a simultaneous luminance variation in those columns. Based on this comparison, it is determined whether flicker is present in the image data. For example, if the difference between weighted sums of luminance between frames exceeds a threshold value in a selected number of columns then there is a simultaneous luminance variation in those columns, and a horizontal pattern of flicker has been detected in the image data.

In some embodiments, steps 204-208 are performed using multiple patterns of alternating sign weights. Specifically, steps 204 and 206 can be performed using a different pattern of alternating sign weights, such as patterns that are 90 degrees out of phase with each other. This improves the probability of detecting flicker by increasing the likelihood that the flicker variation will occur in phase with at least one of the patterns of alternating sign weights.

Figure 3:
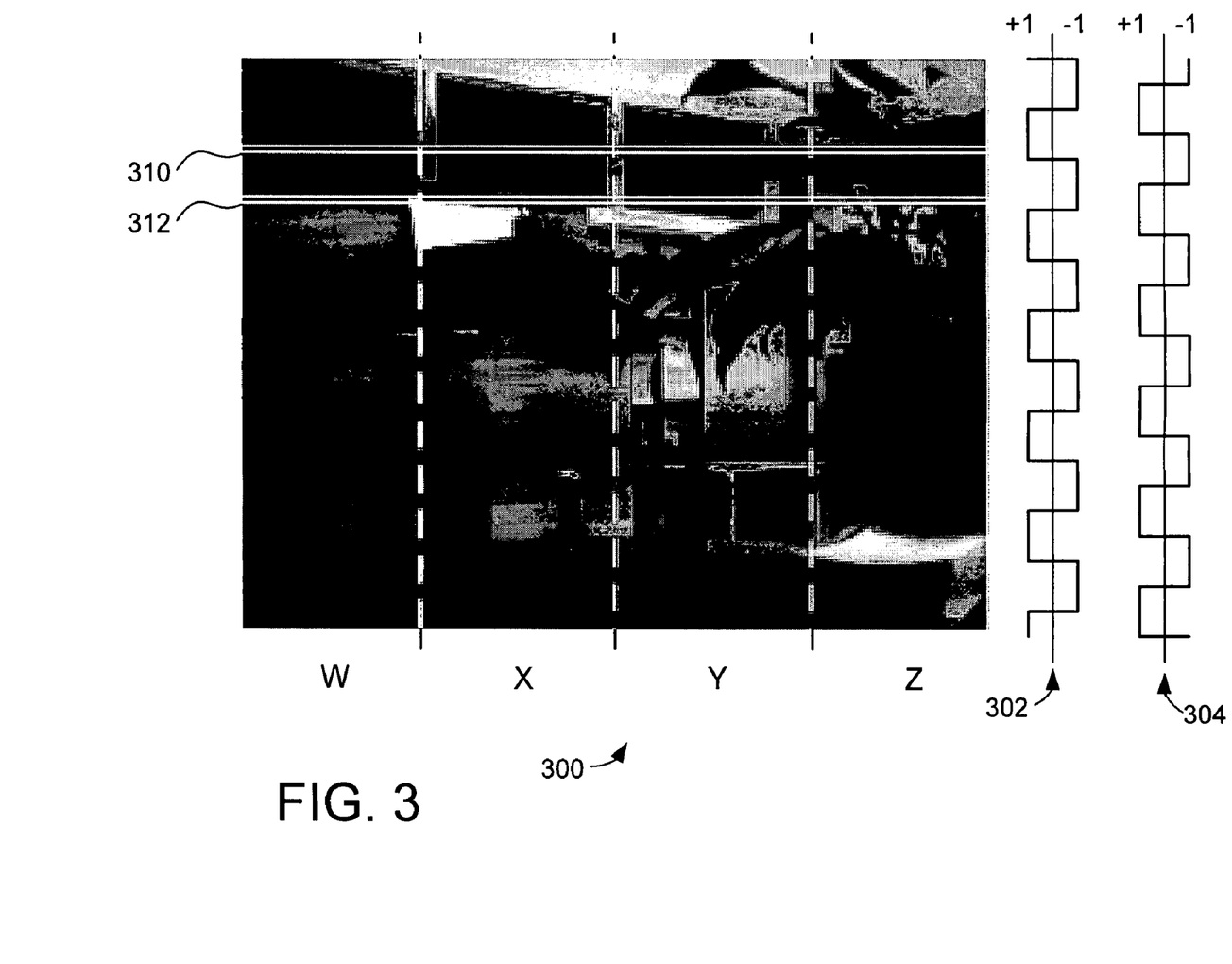
FIG. 3 is a schematic view of an exemplary image and alternating sign weight patterns.

Turning now to FIG. 3, an exemplary image 300, a first pattern of alternating sign weights 302 and a second pattern of alternating sign weights 304 are illustrated schematically. The image 300, patterns 302 and 304 will be used to illustrate a specific embodiment of a flicker detection system and method. The image 300 is divided into four columns, labeled W, X, Y and Z. The image 300 is made up of a plurality of rows, with each row including a plurality of pixels, such as red and green pixels and blue and green pixels in a Bayer pattern in image.

Two patterns of alternating sign weights are illustrated in FIG. 3, with the two patterns being 90 degrees out of phase with respect to each other. In this example, the patterns of alternating sign weights both alternate from +1 to −1 and so forth. It should be noted that while this relatively simple pattern provides effective flicker detection, in some cases it may be desirable to use more complex patterns that use different magnitudes of weight over the image.

Specifically, other implementations can use a more complicated combination of the information multiple patterns. For example, a computation of the modulus=$(\sin^2+\cos^2)^{1/2}$ (where sin and cos are the two patterns of alternating sign weights) gives the magnitude of flicker that is situated where it can contribute to both, and $\tan^{-1}$ (sin/cos) which gives the phase angle of the flicker to make sure it's the same in all columns; and to see it roll from frame to frame need to see modulus exceeding a threshold value and the phase changing from frame to frame.

The pixels in each row are weighted according to the position of its row in the pattern of alternating sign weights. Thus, for exemplary row 310, the pixels would be weighted using a +1 when a weighted sum is performed using the pattern of alternating sign weights 302, and would be weighted with a −1 when a weighted sum is performed using the pattern of alternating sign weights 304. Conversely, for exemplary row 312, the pixels would be weighted using a −1 when a weighted sum is performed using the pattern of alternating sign weights 302, and would be weighted with a +1 when a weighted sum is performed using the pattern of alternating sign weights 304. In general, a typical CMOS sensor has an input clock which determines how fast it moves from row to row in opening and closing the rows of pixels to the scene. By knowing the time when a pixel was sampling the illuminated scene, it can be determined whether the pixel should be weighted using a +1 or −1. Stated another way, by knowing the time when a pixel was sampling the illuminated scene, it can be determined whether to consider the luminance of that pixel to contribute positively, and when (½ cycle of 120 Hz later) to take the contribution in the negative sense.

The frequency and period of the alternating sign weight patterns would preferably be selected to correspond to likely flicker in the data image. For example, the frequency and period of the patterns can be selected to match illumination power frequency, e.g., 50 Hz or 60 Hz, which are common standards for illumination power (though other frequencies might occur in some illumination sources).

For example, the period can be selected to switch at a 60 Hz line frequency, at integer multiples of 1/(2*60*2) or 4.167 ms, where the 60 Hz power causes the illumination to have a frequency of variation of 120 Hz. Thus, each ¹/₁₂₀ of a second the illumination goes through a light and a dark swing, 4.167 ms each.

As stated above, a typical CMOS sensor has an input clock which determines how fast it moves from row to row in opening and closing the rows of pixels to the scene. Using this clock it can be determined which pixels got the bright 4.167 ms of the cycle, and which got the dark 4.167 ms of the cycle. For example, the system can count the pixel clock pulses, and knowing the pixel clock frequency, can determine when 4.167 ms has elapsed, and can thus determine when its time to switch. In another embodiment another clock, including a completely independent clock, can be used to decide when to switch signs.

The system determines which pixels were exposed during which part of the cycle. For example, the system can assume the pixels are exposed a fixed time interval before when they arrive at the image processor. However, they could have been stored for a period of time before being sent, and this information depends on the details of the sensor data output chain, and could also be included in the decision of whether any given pixel is part of the bright part, or part of the dark part of the cycle, or exactly which angles of illumination phase the given pixel was exposed. In some cases it will be desirable to perform duplicate calculations using both 60 Hz and 50 Hz patterns. This would be desirable for some cameras destined to go to Europe or Asia (where the power is 50 Hz) and some to US (where it is 60 Hz).

When used to perform weighted summing, the two patterns of alternating sign weights serve to accumulate or subtract pixels values, depending on their location in the image and thus depending on the time elapsed from the start of the window of interest, where the window of interest is the actual rectangle of pixels in the sensor which are being processed to form the final image. In any case, there is usually a time interval from the end of one row to the start of the next row during which no valid pixel data is actually being sent. Thus the clock counting up 4.167 ms should continue counting during the gap, even though no pixel data is arriving. Thus, the time counted is the time elapsed between when the first pixel in the image was exposed, and when the current pixel in the image was exposed.

Using the Example of FIG. 3, a first weighted sum SW of the column W can be defined as:

$$SW = \sum_r P1(r) * W(r) \quad (1.)$$

where r is the row of the pixel, P1(r) is the pattern value at row r using the first alternating sign pattern (e.g., pattern 302) and W(r) is the is the sum of green pixel values in row r of column W. The weighted sum SW is calculated using equation 1 for a plurality of rows in the image. It should be noted in these equations it is not required to use all rows of image data, in fact is generally desirable to crop the image data such that only rows in full periods of the alternating sign pattern are used. For example, r can start at row 1 and end at the last complete period of the pattern. This helps insure that the summation is balanced between positive and negative weighting which helps ensure reliable flicker detection.

A second weighted sum weighted sum CW of the column W can likewise be defined as:

$$CW = \sum_r P2(r) * W(r) \quad (2.)$$

where r is the row of the pixel, P2(r) is the pattern value at row r using the second alternating sign pattern (e.g., pattern 304) and W(r) is the is the sum of green pixel values in row r of column W. Again, the second weighted sum CW is calculated using equation 2 for a plurality of rows in the image.

Likewise, similar weighed sums can be calculated for columns X, Y and Z using equations 3-8 defined as:

$$SX = \sum_r P1(r) * X(r) \quad (3.)$$

$$CX = \sum_r P2(r) * X(r) \quad (4.)$$

$$SY = \sum_r P1(r) * Y(r) \quad (5.)$$

$$CY = \sum_r P2(r) * Y(r) \quad (6.)$$

-continued $$SZ = \sum_r P1(r) * Z(r) \quad (7.)$$

$$CZ = \sum_r P2(r) * Z(r) \quad (8.)$$

where SX is the first weighted sum for column X, CX is the second weighted sum for column X, and X(r) is the is the sum of green pixel values in row r of column X; where SY is the first weighted sum for column Y, CY is the second weighted sum for column Y, and X(r) is the sum of green pixel values in row r of column Y; and where SZ is the first weighted sum for column Z, CZ is the second weighted sum for column Z, and X(r) is the is the sum of green pixel values in row r of column Z. Thus, equations 1-8 define weighted sums based on two pattern of alternating sign weights.

As described above, a comparison of the weighted sums are used to determine if flicker exists in the image data. For example, if the difference between weighted sums of luminance between frames exceeds a threshold value in most of the columns then a horizontal pattern of flicker has been detected in the image data. In one embodiment, the threshold values used are determined at least in part by the overall luminance in each of the columns. This compensates for the fact that flicker will be less pronounced in dark areas of the image. Thus, it is desirable to compare the size of the difference to average brightness in the same column. As one specific example, the overall luminance MW of column W can be calculated as:

$$MW = \sum_r W(r) \quad (9.)$$

where again r is the row of the pixel and W(r) is the is the sum of green pixel values in row r of column W. Likewise the overall luminance of columns X, Y and Z can be calculated as:

$$MX = \sum_r X(r) \quad (10.)$$

$$MY = \sum_r Y(r) \quad (11.)$$

$$MZ = \sum_r Z(r) \quad (12.)$$

where MX is the overall luminance of column X, X(r) is the is the sum of green pixel values in row r of column X, where MY is the overall luminance of column Y, Y(r) is the is the sum of green pixel values in row r of column Y, and where MZ is the overall luminance of column Z, Z(r) is the is the sum of green pixel values in row r of column Z. Using the overall luminance to define the threshold value effectuates determination of flicker because the amount of flicker is expected to be proportional to the overall brightness of the corresponding column.

A variety of different techniques can be used for the comparison of the weighted sums to determine if flicker exists in the image data. Again, using the example of FIG. 3 and equations 1-12, the difference between weighted sums can be calculated for each column and compared to a threshold value. This comparison determines if flicker is present in the image data. Furthermore, because ordinary image features can partly obscure the effects of flicker on the weighted sum it is desirable to perform additionally a frame-to-frame comparison to determine the differences in the weighted sums. As a specific example, the comparison can be performed using the following procedure:

$$\text{if}\left(\begin{array}{l}(SW_1-SW_2>\frac{T*MW}{32})\&(SX_1-SX_2>\frac{T*MX}{32})\&\\(SY_1-SY_2>\frac{T*MY}{32})\&(SZ_1-SZ_2>\frac{T*MZ}{32})\end{array}\right)$$

$$\text{elseif}\left(\begin{array}{l}(CW_1-CW_2>\frac{T*MW}{32})\&(CX_1-CX_2>\frac{T*MX}{32})\&\\(CY_1-CY_2>\frac{T*MY}{32})\&(CZ_1-CZ_2>\frac{T*MZ}{32})\end{array}\right)$$

$$\text{elseif}\left(\begin{array}{l}(SW_1-SW_2<\frac{-T*MW}{32})\&(SX_1-SX_2<\frac{-T*MX}{32})\&\\(SY_1-SY_2<\frac{-T*MY}{32})\&(SZ_1-SZ_2<\frac{-T*MZ}{32})\end{array}\right)$$

$$\text{elseif}\left(\begin{array}{l}(CW_1-CW_2<\frac{-T*MW}{32})\&(CX_1-CX_2<\frac{-T*MX}{32})\&\\(CY_1-CY_2<\frac{-T*MY}{32})\&(CZ_1-CZ_2<\frac{-T*MZ}{32})\end{array}\right)$$

(13.)

where $SW_1$, $SX_1$, $SY_1$, $SX_1$, $SZ_1$, $CW_1$, $CX_1$, $CY_1$, $CX_1$, and $CZ_1$ are the weighted sums from a first frame in the image data and $SW_2$, $SX_2$, $SY_2$, $SX_2$, $SZ_2$, $CW_2$, $CX_2$, $CY_2$, $CX_2$, and $CZ_2$ are the weighted sums from a second frame of image data and where T is a specified multiplier. The specified multiplier can be picked empirically by examining actual images with flicker bars superimposed and 'rolled'. For example, if the specified multiplier T is 4, the flicker component is about ⅛=12.5% of the mean luminance. This corresponds to a level of flicker that would be noticeable in a video image sequence and in some still images.

Using equation 13, if any of the four conditions hold, then flicker has been detected. Thus, flicker is detected if the difference between weighted sums is greater than a threshold value for each of the four columns. Specifically, equation 13 calculates the difference by subtracting weighted sums and determining if the difference is greater than the positive threshold value of less than the negative threshold value. This effectively determines if the magnitude of the difference is greater than the threshold value.

It should be noted that while equation 13 requires that the difference be greater than the threshold value for each of the four columns, that in some cases it may be desirable to only require a percentage of columns to have such a difference. For example, one application may detect flicker if only 3 out of 4 or 4 out of 6 columns have a difference greater than the threshold value.

It should also be noted that equation 13 requires that the detected luminance difference have the same "sign" in all four columns for flicker to be detected. Thus, the luminance difference in all four columns must all be greater than a threshold amount (e.g., bright), or must all be less than a negative of the threshold amount (e.g., dark). In each case, the difference exceeds the threshold amount in the same direction for all four columns. Flicker is thus only detected when the luminance variation of the same sign occurs simultaneously in all four columns of the image, and in phase in all four columns. Otherwise, luminance variations resulting from other causes would be more likely to be misinterpreted as flicker. Thus, requiring that the variation have the same sign helps ensure that horizontal luminance variation caused by flicker is detected as flicker, while non-horizontal luminance variation, likely not caused by flicker, is not detected as flicker. Equations 1-13 thus effectively perform a directional wave-pattern filtering, specifically a wave pattern directed in the manner caused by flicker, using an appropriate spatial filtering defined by the column-to-column comparison and alternating sign pattern, followed by a frame-to-frame comparison. This results in reliable flicker detection.

Thus, the present invention provides a system and method for detecting flicker in a digital image. The system and method detects flicker by performing a column-to-column, row-to-row, and frame-to-frame comparison of image data. The frame-to-frame comparison of image data is based on dividing each image into multiple columns, and performing a weighted sum of the pixel luminance in each column using a pattern of alternating sign weights. Specifically, the pattern of alternating sign weights is used to sum the pixel luminance for each column in the image, with the sign applied to each pixel determined by the position of its row in the pattern of alternating sign weights. The pattern of alternating sign weights is selected to potentially correspond to potential luminance variation in the rows, and thus when used to sum the pixel luminance the pattern can potentially magnify the effect of flicker in the image data. The weighted sum of luminance for each column in a first frame is compared to the weighted sum of luminance for that column in a second frame to determine if there is a simultaneous luminance variation in those columns. For example, if the difference between weighted sums of luminance between frames exceeds a threshold value in a predetermined number of columns then there is a simultaneous luminance variation in those columns, and a horizontal pattern of flicker has been detected in the image data. The operational parameters of the digital camera can then be adjusted to reduce or compensate for the flicker detected in the image data.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A method of detecting flicker in a digital camera, the method comprising the steps of:
   receiving image data, the image data including a plurality of pixels arranged in a plurality of rows;
   performing a first weighted sum of pixel luminance in a first plurality of columns defined in the image data using a first pattern of alternating sign weights with a summation mechanism, where the performing of the first weighted sum comprises multiplying each of a first plurality of pixels in the first plurality of columns with either a positive sign weight from the first pattern of alternating sign weights or a negative sign weight from the first pattern of alternating sign weights depending on the pixel's row position in the first pattern of alternating sign weights;

performing a second weighted sum of pixel luminance in a second plurality of columns defined in the image data using a second pattern of alternating sign weights with the summation mechanism, where the performing of the second weighted sum comprises multiplying each of a second plurality of pixels in the second plurality of columns with either a positive sign weight from the second pattern of alternating sign weights or a negative sign weight from the second pattern of alternating sign weights depending on the pixel's row position in the second pattern of alternating sign weight; and comparing the first weighted sum of pixel luminance and the second weighted sum of pixel luminance with a comparator to determine if flicker is present in the image data.

2. The method of claim 1 wherein the first pattern of alternating sign weights and the second pattern of alternating sign weights comprise identical patterns.

3. The method of claim 1 wherein the first plurality of columns and the second plurality of columns comprise identical plurality of columns.

4. The method of claim 1 wherein wherein a positive sign weight in the first pattern of alternating sign weight comprises a +1 and a negative sign weight in the first pattern of alternating sign weight comprises a −1.

5. The method of claim 1 wherein the step of performing a first weighted sum of pixel luminance in a first plurality of columns defined in the image data using a first pattern of alternating sign weights comprises performing the first weighted sum on a first digital image and wherein the step of performing a second weighted sum of pixel luminance in a second plurality of columns defined in the image data using a second pattern of alternating sign weights comprises performing the second weighted sum on a second digital image.

6. The method of claim 1 wherein the step of comparing the first weighted sum of pixel luminance and the second weighted sum of pixel luminance to determine if flicker is present in the image data comprises determining a difference between the first weighted sum and the second weighted sum and comparing the difference to a threshold value.

7. The method of claim 6 wherein the threshold value is determined at least in part by an overall luminance in the image data.

8. The method of claim 1 further comprising the steps of:
performing a third weighted sum of pixel luminance in a third plurality of columns defined in the image data using a third pattern of alternating sign weights with the summation mechanism, wherein the third pattern of alternating sign weights is out of phase with the first pattern of alternating sign weights, where the performing of the third weighted sum comprises multiplying each of a third plurality of pixels in the third plurality of columns with either a positive sign weight from the third pattern of alternating sign weights or a negative sign weight from the third pattern of alternating sign weights depending on the pixel's row position in the third pattern of alternating sign weights;

performing a fourth weighted sum of pixel luminance in a fourth plurality of columns defined in the image data using a fourth pattern of alternating sign weights with the summation mechanism, wherein the fourth pattern of alternating sign weights is out of phase with the second pattern of alternating sign weights, where the performing of the fourth weighted sum comprises multiplying each of a fourth plurality of pixels in the fourth plurality of columns with either a positive sign weight from the fourth pattern of alternating sign weights or a negative sign weight from the fourth pattern of alternating sign weights depending on the pixel's row position in the fourth pattern of alternating sign weights; and comparing the third weighted sum of pixel luminance and the fourth weighted sum of pixel luminance with the comparator to determine if flicker is present in the image data.

9. The method of claim 8 wherein the third pattern of alternating sign weights is out of phase with the first pattern of alternating sign weights by substantially 90 degrees and wherein the fourth pattern of alternating sign weights is out of phase with the second pattern of alternating sign weights by substantially 90 degrees.

10. The method of claim 8 wherein the steps of comparing the first weighted sum of pixel luminance and the second weighted sum of pixel luminance to determine if flicker is present in the image data and comparing the third weighted sum of pixel luminance and the fourth weighted sum of pixel luminance to determine if flicker is present in the image data comprises determining a first difference between the first weighted sum and the second weighted sum and comparing the first difference to a first threshold value and determining a second difference between the third weighted sum and the fourth weighted sum and comparing the second difference to a second threshold value.

11. The method of claim 10 wherein flicker is detected if either the first difference exceeds the first threshold value or the second difference exceeds the second threshold value.

12. The method of claim 10 wherein the first threshold value and the second threshold value comprise identical threshold values.

13. The method of claim 1 wherein the first plurality of columns and second plurality of columns each comprise four columns.

14. The method of claim 1 wherein the step of comparing the first weighted sum of pixel luminance and the second weighted sum of pixel luminance to determine if flicker is present comprises determining a difference between the first weighted sum and the second weighted sum for each of the first plurality of columns.

15. The method of claim 14 wherein flicker is determined to be present only if the difference between the first weighted sum and the second weighted sum for each of the first plurality of columns has the same sign.

16. A method of detecting flicker in a digital camera, the method comprising the steps of:
receiving a first digital image, the first digital image including a plurality of pixels arranged in a plurality of rows;
defining a first plurality of columns in the first digital image;
performing a first weighted sum of pixel luminance in each of the first plurality of columns in the first digital image using a first pattern of alternating sign weights with a summation mechanism, where the performing of the first weighted sum comprises multiplying each of a first plurality of pixels in the first plurality of columns with either a positive sign weight from the first pattern of alternating sign weights or a negative sign weight from the first pattern of alternating sign weights depending on the pixel's row position in the first pattern of alternating sign weights;
receiving a second digital image, the second digital image including a plurality of pixels arranged in a plurality of rows;
defining a second plurality of columns in the second digital image;

performing a second weighted sum of pixel luminance in each of the second plurality of columns in the second digital image using a second pattern of alternating sign weights with the summation mechanism, where the performing of the second weighted sum comprises multiplying each of a second plurality of pixels in the second plurality of columns with either a positive sign weight from the second pattern of alternating sign weights or a negative sign weight from the second pattern of alternating sign weights depending on the pixel's row position in the second pattern of alternating sign weights;

determining a difference between the first weighted sum of pixel luminance in each of the first plurality of columns and the second weighted sum of pixel luminance in each of the second plurality of columns with a comparator to determine if flicker is present.

17. The method of claim 16 wherein the step of determining a difference between the first weighted sum of pixel luminance in each of the first plurality of columns and the second weighted sum of pixel luminance in each of the second plurality of columns to determine if flicker is present determines that flicker is present only if the difference between each of the first plurality of columns and second plurality of columns has the same sign.

18. A method of detecting flicker in a digital camera, the method comprising the steps:

receiving a first digital image, the first digital image including a plurality of pixels arranged in a plurality of rows;

defining a first plurality of columns in the first digital image;

performing a first weighted sum of pixel luminance in each of the first plurality of columns in the first digital image using a first pattern of alternating sign weights with a summation mechanism, where the performing of the first weighted sum comprises multiplying each of a first plurality of pixels in the first plurality of columns with either a positive sign weight from the first pattern of alternating sign weights or a negative sign weight from the first pattern of alternating sign weights depending on the pixel's row position in the first pattern of alternating sign weights;

receiving a second digital image, the second digital image including a plurality of pixels arranged in a plurality of rows;

defining a second plurality of columns in the second digital image;

performing a second weighted sum of pixel luminance in each of the second plurality of columns in the second digital image using a second pattern of alternating sign weights with the summation mechanism, where the performing of the second weighted sum comprises multiplying each of a second plurality of pixels in the second plurality of columns with either a positive sign weight from the second pattern of alternating sign weights or a negative sign weight from the second pattern of alternating sign weights depending on the pixel's row position in the second pattern of alternating sign weights;

determining a difference between the first weighted sum of pixel luminance in each of the first plurality of columns and the second weighted sum of pixel luminance in each of the second plurality of columns with a comparator;

defining a third plurality of columns in the first digital image;

performing a third weighted sum of pixel luminance in each of the third plurality of columns in the first digital image using a third pattern of alternating sign weights with the summation mechanism, the third pattern of alternating sign weights substantially 90 degrees out of phase with the first pattern of alternating sign weights, where the performing of the third weighted sum comprises multiplying each of a third plurality of pixels in the third plurality of columns with either a positive sign weight from the third pattern of alternating sign weights or a negative sign weight from the third pattern of alternating sign weights depending on the pixel's row position in the third pattern of alternating sign weights;

defining a fourth plurality of columns in the second digital image;

performing a fourth weighted sum of pixel luminance in each of the fourth plurality of columns in the second digital image using a fourth pattern of alternating sign weights with the summation mechanism, the fourth pattern of alternating sign weights substantially 90 degrees out of phase with the second pattern of alternating sign weights, where the performing of the fourth weighted sum comprises multiplying each of a fourth plurality of pixels in the fourth plurality of columns with either a positive sign weight from the fourth pattern of alternating sign weights or a negative sign weight from the fourth pattern of alternating sign weights depending on the pixel's row position in the fourth pattern of alternating sign weight;

determining a difference between the third weighted sum of pixel luminance in each of the third plurality of columns and the fourth weighted sum of pixel luminance in each of the fourth plurality of columns with the comparator; and determining that flicker is present if either the difference between the first weighted sum of pixel luminance in each of the first plurality of columns and the second weighted sum of pixel luminance in each of the second plurality of columns is greater than a first threshold value or if the difference between the third weighted sum of pixel luminance in each of the third plurality of columns and the fourth weighted sum of pixel luminance in each of the fourth plurality of columns is greater than a second threshold value.

19. A processor tangibly embodying a program of instructions to perform method steps for detecting flicker in a digital camera, the method comprising the steps of:

receiving image data, the image data including a plurality of pixels arranged in a plurality of rows;

performing a first weighted sum of pixel luminance in a first plurality of columns defined in the image data using a first pattern of alternating sign weights with a summation mechanism, where the performing of the first weighted sum comprises multiplying each of a first plurality of pixels in the first plurality of columns with either a positive sign weight from the first pattern of alternating sign weights or a negative sign weight from the first pattern of alternating sign weights depending on the pixel's row position in the first pattern of alternating sign weights;

performing a second weighted sum of pixel luminance in a second plurality of columns defined in the image data using a second pattern of alternating sign weights with the summation mechanism, where the performing of the second weighted sum comprises multiplying each of a second plurality of pixels in the second plurality of columns with either a positive sign weight from the second pattern of alternating sign weights or a negative sign weight from the second pattern of alternating sign weights depending on the pixel's row position in the second pattern of alternating sign weights; and comparing the first weighted sum of pixel luminance and the second weighted sum of pixel luminance with a comparator to determine if flicker is present in the image data.

20. The processor of claim 19 wherein the first pattern of alternating sign weights and the second pattern of alternating sign weights comprise identical patterns.

21. The processor of claim 19 wherein the first plurality of columns and the second plurality of columns comprise identical plurality of columns.

22. The processor of claim 19 wherein the step of performing a first weighted sum of pixel luminance in a first plurality of columns defined in the image data using a first pattern of alternating sign weights comprises performing the first weighted sum on a first digital image and wherein the step of performing a second weighted sum of pixel luminance in a second plurality of columns defined in the image data using a second pattern of alternating sign weights comprises performing the second weighted sum on a second digital image.

23. The processor of claim 19 wherein a positive sign weight in the first pattern of alternating sign weights comprises a +1 and a negative sign weight in the first pattern of alternating sign weights comprises a −1.

24. The processor of claim 19 wherein the step of comparing the first weighted sum of pixel luminance and the second weighted sum of pixel luminance to determine if flicker is present in the image data comprises determining a difference between the first weighted sum and the second weighted sum and comparing the difference to a threshold value.

25. The processor of claim 24 wherein the threshold value is determined at least in part by an overall luminance in the image data.

26. The processor of claim 19 further comprising the steps of:
performing a third weighted sum of pixel luminance in a third plurality of columns defined in the image data using a third pattern of alternating sign weights with the summation mechanism, wherein the third pattern of alternating sign weights is out of phase with the first pattern of alternating sign weights, where the performing of the third weighted sum comprises multiplying each of a third plurality of pixels in the third plurality of columns with either a positive sign weight from the third pattern of alternating sign weights or a negative sign weight from the third pattern of alternating sign weights depending on the pixel's row position in the third pattern of alternating sign weights;
performing a fourth weighted sum of pixel luminance in a fourth plurality of columns defined in the image data using a fourth pattern of alternating sign weights with the summation mechanism, wherein the fourth pattern of alternating sign weights is out of phase with the second pattern of alternating sign weights, where the performing of the fourth weighted sum comprises multiplying each of a fourth plurality of pixels in the fourth plurality of columns with either a positive sign weight from the fourth pattern of alternating sign weights or a negative sign weight form the fourth pattern of alternating sign weights depending on the pixel's row position in the fourth pattern of alternating sign weights; and
comparing the third weighted sum of pixel luminance and the fourth weighted sum of pixel luminance with a comparator to determine if flicker is present in the image data.

27. The processor of claim 26 wherein the third pattern of alternating sign weights is out of phase with the first pattern of alternating sign weights by substantially 90 degrees and wherein the fourth pattern of alternating sign weights is out of phase with the second pattern of alternating sign weights by substantially 90 degrees.

28. The processor of claim 26 wherein the steps of comparing the first weighted sum of pixel luminance and the second weighted sum of pixel luminance to determine if flicker is present in the image data and comparing the third weighted sum of pixel luminance and the fourth weighted sum of pixel luminance to determine if flicker is present in the image data comprises determining a first difference between the first weighted sum and the second weighted sum and comparing the first difference to a first threshold value and determining a second difference between the third weighted sum and the fourth weighted sum and comparing the second difference to a second threshold value.

29. The processor of claim 28 wherein the first threshold value and the second threshold value comprise identical threshold values.

30. The processor of claim 28 wherein flicker is detected if either the first difference exceeds the first threshold value or the second difference exceeds the second threshold value.

31. The processor of claim 19 wherein the first plurality of columns and second plurality of columns each comprise four columns.

32. The processor of claim 19 wherein the step of comparing the first weighted sum of pixel luminance and the second weighted sum of pixel luminance to determine if flicker is present comprises determining a difference between the first weighted sum and the second weighted sum for each of the first plurality of columns.

33. The processor of claim 32 wherein flicker is determined to be present only if the difference between the first weighted sum and the second weighted sum for each of the first plurality of columns has the same sign.

* * * * *